United States Patent
Munson (10) Patent No.: US 9,609,964 B1
(45) Date of Patent: Apr. 4, 2017

(54) POSITIVE LOCKING HANGING SYSTEM (71) Applicant: ORANGE ALUMINUM CORPORATION, Laguna Niguel, CA (US)

(72) Inventor: Cameron Munson, Laguna Niguel, CA (US)

(73) Assignee: ORANGE ALUMINUM CORPORATION, Laguna Niguel, CA (US)

( * ) Notice: Subject to any disclaimer, the term of this patent is extended or adjusted under 35 U.S.C. 154(b) by 0 days.

(21) Appl. No.: 14/878,967

(22) Filed: Oct. 8, 2015

(51) Int. Cl.
A47G 1/00 (2006.01)
A47G 1/16 (2006.01)
F16M 13/02 (2006.01)

(52) U.S. Cl.
CPC ........... *A47G 1/1606* (2013.01); *F16M 13/02* (2013.01); *F16M 2200/02* (2013.01)

(58) Field of Classification Search
CPC .......... A47G 1/1606; A47G 1/20; A47G 1/16; F16M 13/02; A47B 95/008
USPC ............................................. 248/475.1, 489
See application file for complete search history.

(56) References Cited

U.S. PATENT DOCUMENTS

| | | | | |
|---|---|---|---|---|
| 2,299,443 A * | 10/1942 | Walmsley | ............ | A47G 1/1606 248/207 |
| 3,117,353 A * | 1/1964 | Edwards | ............. | E04F 13/0835 248/225.21 |
| 4,228,982 A * | 10/1980 | Sellera | ................. | A47G 1/1606 248/467 |
| 5,961,090 A * | 10/1999 | Parkin | .................. | A47G 1/1606 248/475.1 |
| 6,053,468 A * | 4/2000 | Francis | ................ | A47G 1/1606 248/475.1 |
| 6,286,802 B1 * | 9/2001 | Munson | ............... | A47G 1/1606 248/475.1 |
| 6,322,039 B1 * | 11/2001 | De Luccia | ............. | A47G 1/168 248/222.14 |
| 8,371,543 B2 * | 2/2013 | Schneider | .............. | F16M 13/02 248/224.8 |
| 9,169,653 B2 * | 10/2015 | Porter | ..................... | E04F 13/08 |
| 2003/0038222 A1 * | 2/2003 | Holmes | ................ | A47G 1/1606 248/475.1 |
| 2005/0072894 A1 * | 4/2005 | Grant | ................... | A47G 1/1606 248/475.1 |

(Continued)

Primary Examiner — Anita M King
(74) Attorney, Agent, or Firm — Stetina Brunda Garred and Brucker (57) ABSTRACT A positive locking hanging system is specifically adapted for locking a panel to a wall. The system includes a first elongated mounting member that is configured to be mountable to a wall, and a second elongated mounting member configured to be attachable to a panel. When the first elongated mounting member and the second elongated mounting member are engaged, notches in the first and second elongated mounting members are aligned to form a locking channel. A user may lock the second elongated mounting member to the first elongated mounting member (i.e., lock the panel to the wall) by inserting a locking element into the locking channel. The locking element constrains the movement of the elongated mounting members which results in the panel being locked to the wall. As a result, this may address seismic concerns such as an earthquake, and may prevent a thief from merely removing the panel from the wall when the locking element is inserted.

20 Claims, 4 Drawing Sheets (56) References Cited

U.S. PATENT DOCUMENTS

| | | | |
|---|---|---|---|
| 2006/0091271 A1* | 5/2006 | Nowak | A47B 95/008 248/225.21 |
| 2006/0266900 A1* | 11/2006 | May | A47B 95/008 248/220.22 |
| 2008/0083514 A1* | 4/2008 | Munson | A47F 5/0846 160/184 |
| 2012/0153108 A1* | 6/2012 | Schneider | F16M 13/02 248/224.8 |

* cited by examiner

POSITIVE LOCKING HANGING SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure generally relates to a positive locking hanging system that is used for locking a picture, wall panel, frame, or other structure to a wall, and more specifically to mounting members that are mountable to a picture and a wall.

2. Description of the Related Art

It is well known that some conventional picture hanging kits utilize French cleats to hang a picture to a wall. In this respect, a French cleat comes in pairs, a cleat and a matching edge. A user may independently mount the cleat to the wall and the matching edge onto the picture to be hung. The user may then hang the picture to the wall by aligning the matching edge and the cleat. The angled surface of the cleat and matching edge allows the two pieces to tightly mount against each other. As the user tightly mounts the two pieces together, the picture is drawn closer and tightly to the wall. In order to remove the picture, the user may lift the picture in an upward direction and disengage the matching edge from the cleat.

However, there are some deficiencies associated with using French cleats to hang a picture to a wall. One significant deficiency of using French cleats to hang a picture to a wall is that the picture is susceptible to theft if the picture is hung in a public environment. A thief can steal the picture by merely lifting the picture and disengaging the French cleat.

Another deficiency commonly associated with using French cleats is that it does not address potential accidents that might occur. For example, someone may inadvertently knock over the picture or an earthquake may occur. If someone knocks over the picture or if an earthquake occurs, the French cleat may disengage and the picture may drop and become damaged.

Accordingly, there is a need in the art for a positive locking hanging system for theft preventative measures and to address seismic concerns such as an earthquake.

BRIEF SUMMARY

There is provided a positive locking hanging system that is specifically adapted for mounting a panel to a wall. The system includes a first elongated mounting member that is configured to be mountable to a wall. The system further includes a second elongated mounting member configured to be attachable to a surface or face of a panel. The user may selectively engage the second elongated mounting member to the first elongated mounting member, thus, hanging the panel to the wall. Once the first elongated mounting member and second elongated mounting members are engaged, a first notch located on the first elongated mounting member and a second notch located on the second elongated mounting member forms a locking channel. A user may lock the second elongated mounting member to the first elongated mounting member by inserting a locking element into the locking channel. The locking element creates an interference with the first elongated mounting member and the second elongated mounting member which constrains the movement of the elongated mounting members, accordingly, the panel is locked and is prevented from being pulled upward and away from the wall. Therefore, if a user incorporates this system for mounting the panel (e.g., picture) to a wall in a public environment, a thief cannot merely lift and steal the picture. Furthermore, if the positive locking hanging system is used for mounting a panel to a wall, this may address seismic concerns such as an earthquake.

The first elongated mounting member the second elongated mounting member may be fabricated from an extrudable material (e.g., aluminum, plastic, etc.)

The first mounting surface and the second mounting surface of the elongated mounting members may be mounted to the panel and the wall by the use of mechanical fasteners. The first mounting surface and the second mounting surface of the elongated mounting members may include a plurality of holes adapted to receive to mechanical fasteners.

A first engagement surface and a second engagement surface of the elongated mounting members may form an angle between 5 degrees and 20 degrees relative to a mounting plane. The entirety of the first engagement surface and the entirety of the second engagement surface may be spaced from their respective mounting plane. Furthermore, the first engagement surface and the second engagement surface may be in direct contact with each other when the first engagement surface is engaged with the second engagement surface.

The locking element may create an interference fit in the locking channel when the locking element is inserted into the locking channel. The locking element may mitigate movement of the first elongated mounting member relative to the second elongated mounting member along a central axis. The locking element may further create an interference fit between the locking element with respect to the first elongated mounting member and the second elongated mounting member.

A first shoulder of the first elongated mounting member may be complementary with a second abutment surface of the second elongated mounting member. Furthermore, a second shoulder of the second elongated mounting member may be complementary with a first abutment surface of the first elongated mounting member.

In accordance with another example and not a limitation, the system includes a male member configured to be coupled to the panel. The system further includes a female member configured to be coupled to a mounting surface. The user may engage the first engagement portion of the male member with the second engagement portion of the female member to hang the panel to the mounting surface. Once the first engagement portion and the second engagement portion are engaged, a first locking surface located on the first engagement portion and a second locking surface located on the second engagement portion forms a locking channel. A locking element that is configured to be insertable into the locking channel may be inserted into the locking channel to lock the female member to the male member, thus, locking the panel to the mounting surface.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Referring now to the drawings, wherein the showings are for purposes of illustrating a positive locking hanging system 8, there is depicted a wall 10 having a first elongated mounting member 12 mounted on a mounting surface 14 of the wall 10. The drawings also demonstrates a panel 16 having a second elongated mounting member 18 configured to be attachable about a surface of the panel 16. The second elongated mounting member 18 is configured to be selectively engagaeable with the first elongated mounting member 12 that is mounted on the mounting surface 14 of the wall 10. Once the user engages the first elongated mounting member 12 with the second elongated mounting member 18, a first notch 20 located on the first elongated mounting member 12 is aligned to a second notch 22 located on the second elongated mounting member 18 which creates a locking channel 24. A locking element 26 is configured to be insertable into the locking channel 24. Once the user inserts the locking element 26 into the locking channel 24, the second elongated mounting member 18 is locked to the first elongated mounting member 12. The locking element 26 creates an interference with the first elongated mounting member 12 and the second elongated mounting member 18 which prevents the panel 16 from being pulled upward and away from the wall 10. As a result, if a second elongated mounting member 18 is attached to the panel 16 (e.g., picture), a user may lock the second elongated mounting member to the first elongated mounting member that is attached to the wall 10 by inserting the locking element 26 into the locking channel 24. A thief cannot merely lift the panel 16 away from the wall without first removing the locking element 26. In this respect, the positive locking hanging system 8 combines the features of a conventional French cleat without suffering from deficiencies such as the lack of theft deterrent features and may also address seismic concerns such as an earthquake.

Figure 1:
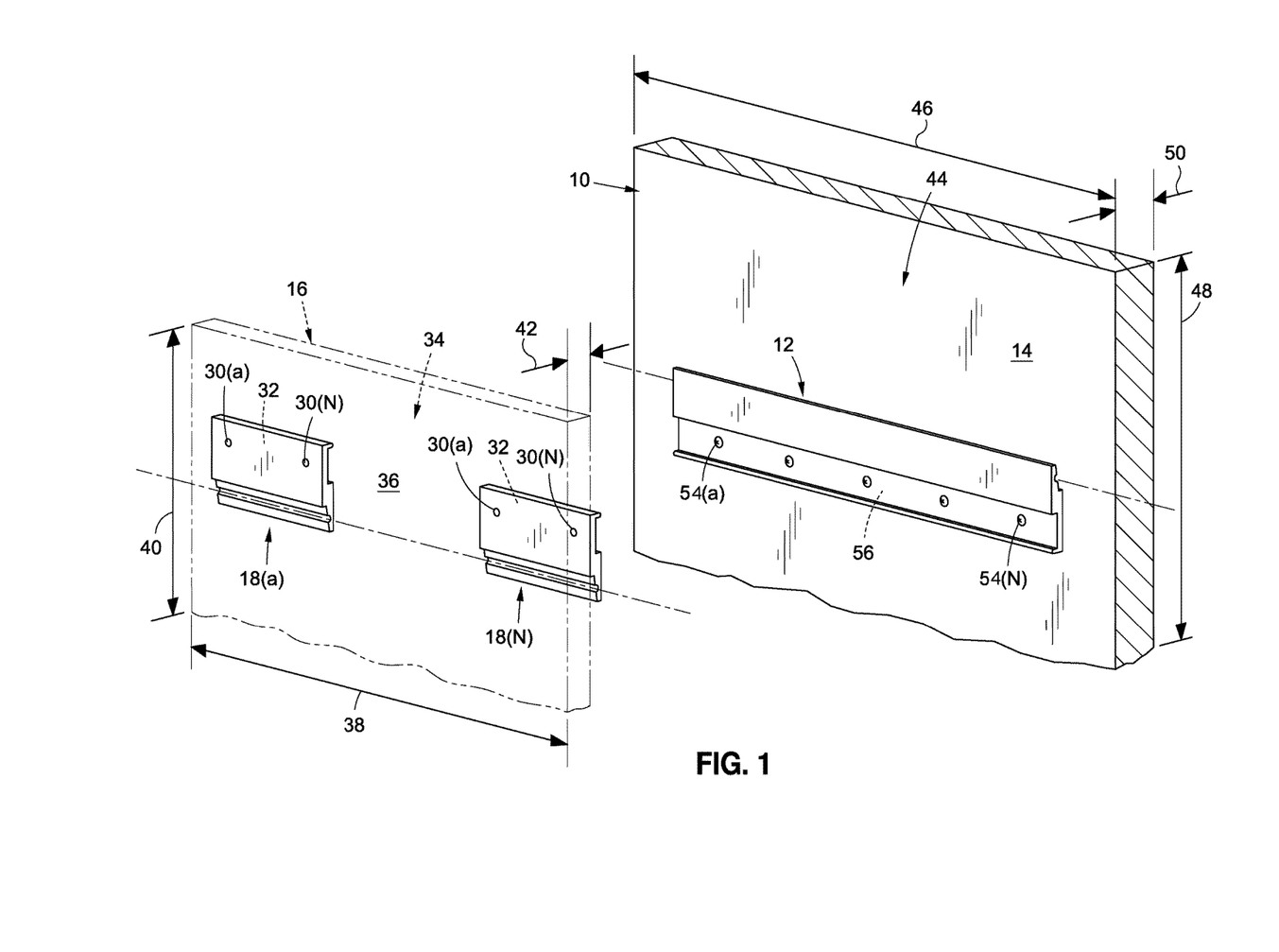
FIG. 1 is an elevational view of a panel and wall having a mounting member mounted to it.

Referring now specifically to FIG. 1, the panel 16 includes an inner surface 34, an opposing outer surface 36, width 38, length 40, and thickness 42. Similarly, the wall 10 includes a mounting surface 14, opposing outer surface 44, width 46, length 48, and thickness 50. The surfaces 14, 34, 36, and 44 may be planar or curved; and the widths, lengths, and thicknesses of the wall 10 and panel 16 can be of any dimension or size. The panel 16 may be a painting, picture, or any other object. Furthermore, the wall 10 may be vertical, at an incline, an interior or exterior wall, or even a ceiling panel.

The wall 10 may have one or more first elongated mounting members 12 that are configured to be attachable the mounting surface 14. The first elongated mounting member 12 is considered to be attachable by virtue of any attaching technique known by those skilled in the art such as by the use of wall fasteners 52. By way of an example and not a limitation, the first elongated mounting member 12 includes a plurality of holes 54(a), . . . 54 (N) that are disposed about the first mounting surface 56 of the first elongated mounting member 12. The holes 54(a)-(N) in the first mounting surface 56 may be through-holes that are capable of receiving wall fasteners 52 in one end of hole 54 and out the other end of the hole 54 to attach the first elongated mounting member 12 to wall 10. The holes 54(a)-(N) may be internally threaded to accommodate wall fasteners 52 for attaching the first elongated mounting member 12 to wall 10. The holes 54(a)-(N) may be any shape, geometry, or size, and may be tapered to facilitate mounting to the wall 10. The holes 54(a)-(N) may be evenly distributed, or staggered along the first mounting surface 56. To ensure that the wall fasteners 52 can withstand the tensile loads, shear loads, and bending moment created by the weight of the panel 16 and the second elongated mounting member 18, the wall fasteners 52 may be fabricated from any material and be of any suitable size, or geometry, that is sufficient to support the loading condition caused by the panel 16 and the second elongated mounting members 18.

The panel 16 may comprise one or more second elongated mounting members 18(a), . . . 18(N) that are attached to the inner surface 34 of the panel 16. The second elongated mounting member 18 is considered to be mountable by virtue of any mounting technique known by those skilled in the art such as by the use of mechanical fasteners 28. By way of an example and not a limitation, the second elongated mounting member 18 includes a plurality of holes 30(a), . . . 30(N) that are disposed along a second mounting surface 32 of the second elongated mounting member 18. The holes 30(a)-(N) on the second mounting surface 32 may be through-holes that are capable of receiving mechanical fasteners 28 in one end of hole 30 and out the other end of the hole 30 to join the second elongated mounting member 18 to panel 16. The holes 30(a)-(N) may be internally threaded to accommodate mechanical fasteners 28 in order to couple the second elongated mounting member 18 to panel 16. The holes 30(a)-(N) may be any shape, geometry, or size, and may be tapered to facilitate mounting to the panel 16. The holes 30(a)-(N) may be evenly distributed, or staggered along the second mounting surface 32. To ensure that the mechanical fasteners 28 can support the tensile loads, shear loads, and bending moment created by the weight of the panel 16, the mechanical fasteners 28 may be fabricated from any material and be any suitable size, or geometry, that is sufficient to support the loading condition caused by panel 16.

Figure 2:
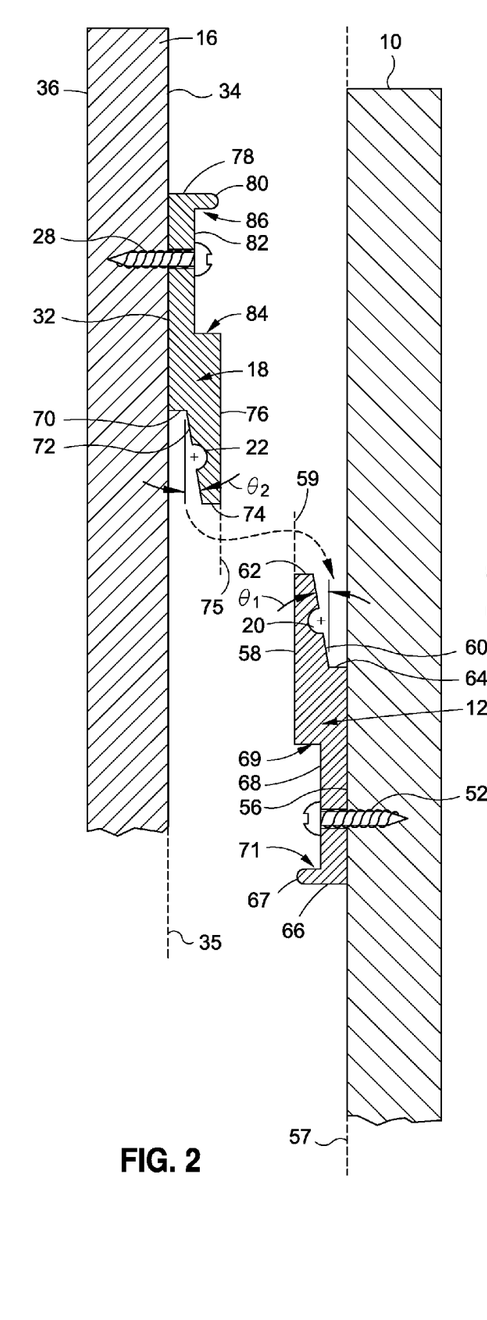
FIG. 2 illustrates a side view of a panel and wall with the attached first elongated mounting member and second elongated mounting member in a disengaged position.

Referring now to FIG. 2, depicted is a sectional view of wall 10 and panel 16 with their respective mounting members, the first elongated mounting member 12, and the second elongated mounting member 18. The first elongated mounting member 12 is attached to wall 10 with wall fastener 52. The second elongated mounting member 18 is attached to panel 16 with mechanical fastener 28. FIG. 2 depicts the first elongated mounting member 12 and the second elongated mounting member 18 in their disengaged position.

The first elongated mounting member 12 includes the first mounting surface 56, an opposing first distal surface 58 that defines a first distal plane 59, a first engagement surface 60, a first notch surface 20, a first shoulder 62, a first abutment surface 64, a first shoe 66, a first shoe radius 67, a first pocket surface 68, a first primary sidewall 69, and a first secondary sidewall 71.

The first mounting surface 56 defines a first mounting plane 57, with the first mounting surface 56 being generally in contact with the mounting surface 14 of wall 10 when the user mounts the first elongated mounting member 12 to the wall 10. The distal surface 58 of the first elongated mounting member 12 defines the first distal plane 59, which is generally parallel relative to the first mounting surface 56. The distal surface 58 may contact the panel inner surface 34 when the first elongated mounting member 12 and the second elongated mounting member 18 are in an engaged position (see FIG. 3). The first engagement surface 60 extends longitudinally along the first elongated mounting member 12 and resides between the first mounting plane 57 and the first distal plane 59. According to one embodiment, the first engagement surface 60 forms an angle, $\Theta_1$, relative to the first mounting plane 57 and may be engageable with a second engagement surface 72 of the second elongated mounting member 18. The preferred angle $\Theta_1$ of the first engagement surface is approximately nine degrees. However, in other embodiments, the first engagement surface 60 may be substantially parallel to the first mounting plane 57, resulting in an angle $\Theta_1$ of approximately zero degrees. However, in other embodiments, the angle $\Theta_1$ between the first engagement surface 60 and the first mounting plane 57 may also be as large as twenty degrees, or be of any suitable angle that allows the first engagement surface 60 to become engageable with the second engagement surface 72 of the second elongated mounting member 18. In other words, the suitable angle of the engagement surfaces 60, 72, allows the first notch 20 to be aligned to the second notch 22 to create a locking channel 24. Furthermore, the entirety of the first engagement surface may be spaced from the first mounting plane 57 to form the first abutment surface 64.

The first notch surface 20 is located within the first engagement surface 60, it extends into the first elongated mounting member 12 generally along any position within the first engagement surface 60. The first notch surface 20 generally resides between the first shoulder 62 and the first abutment surface 64. The first notch surface 20 further defines a segment of the locking channel 24.

The first elongated mounting member 12 further includes the first shoulder 62 that extends between the first engagement surface 60 and the first distal surface 58. The first shoulder 62 is configured and adapted to be complimentary in shape to a corresponding second abutment surface 70 of the second elongated mounting member 18. The first abutment surface 64 surface is positioned between the first engagement surface 60 and the first mounting plane 57. When a user engages the first elongated mounting member 12 with the second elongated mounting member 18, the first abutment surface 64 may contact a second shoulder 74 that is located on the second elongated mounting member 18. The first shoe 66 generally extends from the lower edge of the first pocket surface 68 and the first mounting surface 56 in a direction away from the wall 10 and towards the first distal plane 59. However, the first shoe 66 generally does not interfere with the panel 16 when the elongated members are engaged. The first shoe 66 may also include the first shoe radius 67 that extends towards the first distal plane 59.

The first elongated mounting member 12 further includes the first pocket surface 68 that is generally in an opposed relation relative to the first mounting surface 56. It resides between the first primary sidewall 69 and the first secondary sidewall 71. The first pocket surface 68 may generally accommodate the head of the wall fastener 52. When the user engages the second elongated mounting member 18 with the first elongated mounting member 12, the wall fastener 52 does not interfere with the panel inner surface 34.

The second elongated mounting member 18 includes the second mounting surface 32, an opposing second distal surface 76, a second engagement surface 72, a second notch surface 22, the second shoulder 74, the second abutment surface 70, a second shoe 78, a second shoe radius 80, a second pocket surface 82, second primary sidewall 84, and a second secondary sidewall 86. Similarly, as discussed above with respect to the first elongated mounting member 12, the geometry of the second elongated mounting member 18 conforms similarly to the discussion above relating the first elongated mounting member 12. In this respect, the second mounting surface 32 defines a second mounting plane 35 which is generally in contact with the panel 16 when then user mounts the second elongated mounting member 18 to the panel 16. Furthermore, the second engagement surface 72 extends longitudinally along the second elongated mounting member 18 and resides between the second mounting plane 35 and a second distal plane 75, with the second engagement surface 72 forming an angle, $\Theta_2$, relative to the second mounting plane 35. According to various embodiments, the angle $\Theta_2$ is preferably between five degrees and twenty degrees, and more specifically approximately nine degrees, although it is understood that the angle $\Theta_2$ may be as small as zero degrees.

The first elongated mounting member 12 and the second elongated mounting member 18 are fabricated from extruded materials having suitable strengths to support any applied external loads and the weight of panel 16. The first elongated mounting member 12 and the second elongated mounting member 18 may be extruded from a metallic element such as a 6063-T5 aluminum alloy. Of course, other suitable materials known in the art may also be used without departing from the spirit and scope of the present disclosure. Suitable materials may be rigid, elastic, and generally resistant to heat, stress, and corrosion. Additionally, molding and extrusion techniques may be utilized to manufacture the first elongated mounting member 12 and the second elongated mounting member 18.

Figure 3:
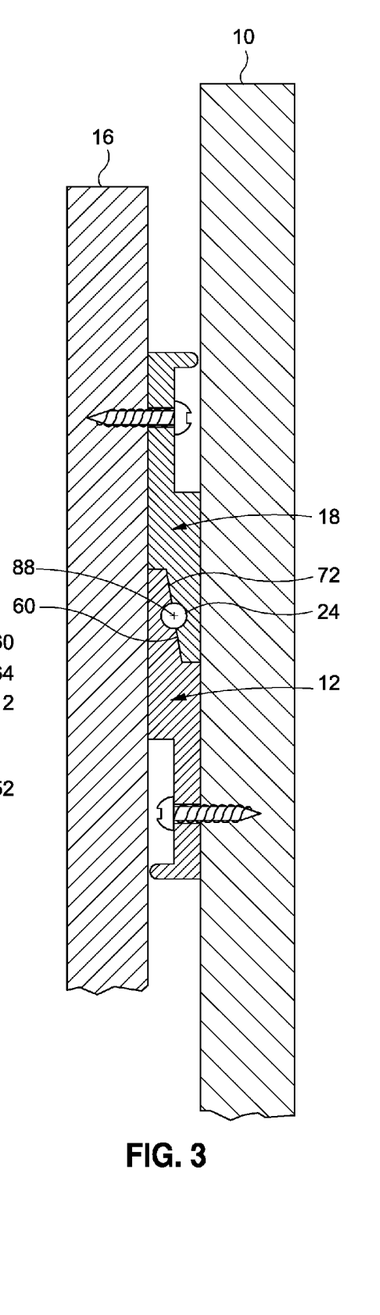
FIG. 3 illustrates a side view of a panel and wall with the attached first elongated mounting member and second elongated mounting member in an engaged position.

Referring to FIG. 3, the figure depicts the first elongated mounting member 12 and the second elongated mounting member 18 in their engaged position. With the first elongated mounting member 12 mounted to the wall 10, and the second elongated mounting member 18 mounted to panel 16, the user engages the first elongated mounting member 12 and the second elongated mounting member 18 by aligning the first engagement surface 60 with second engagement surface 72. In the engaged position, the first notch 20 located on the first elongated mounting member 12 is aligned with the second notch 22 located on the second elongated mounting member 18. The notch 20 and the notch 22 extends around a central axis 88 and forms a locking channel 24. The locking channel 24 is adapted to receive a locking element where a user can lock the second elongated mounting member 18 to the first elongated mounting member by inserting the locking element 26 into the locking channel 24. Furthermore, the first shoulder 62 is complementary with the second abutment surface 70 wherein the surfaces may be in contact with each other. Similarly, the second shoulder 74 is complementary with the first abutment surface 64 wherein the surfaces may also be in contact with each other.

The first shoulder 62 and the second shoulder 74 are specifically configured and adapted to be complimentary in shape and maintain contact with the corresponding abutment surfaces 70 and 64. However, the user may engage the engagement surfaces 60, 72 and still be able to form a locking channel 24 without the surfaces of shoulders 62, 74 and abutment surfaces 70, 64 being in contact.

The locking channel 24 is adapted to allow a user to insert a locking element 26 into the locking channel 24. As shown in FIG. 3, when the user engages the elongated mounting members 12 and 18, the first notch 20 and second notch 22 combines and extends around a central axis 88 to form a circular shaped locking channel 24. The locking channel 24 is not limited to a circular configuration; it may just as well be of any other suitable shape, such as an oval, square, rectangular, triangular, etc. Accordingly, the shape of the corresponding locking element 26 will depend on the shape of the locking channel 24. For example, if the locking channel 24 has a triangular configuration, the corresponding locking element 26 will also be triangular or any other suitable shape or size that will lock the second elongated mounting member 18 to the first elongated mounting member 12.

Figure 4:
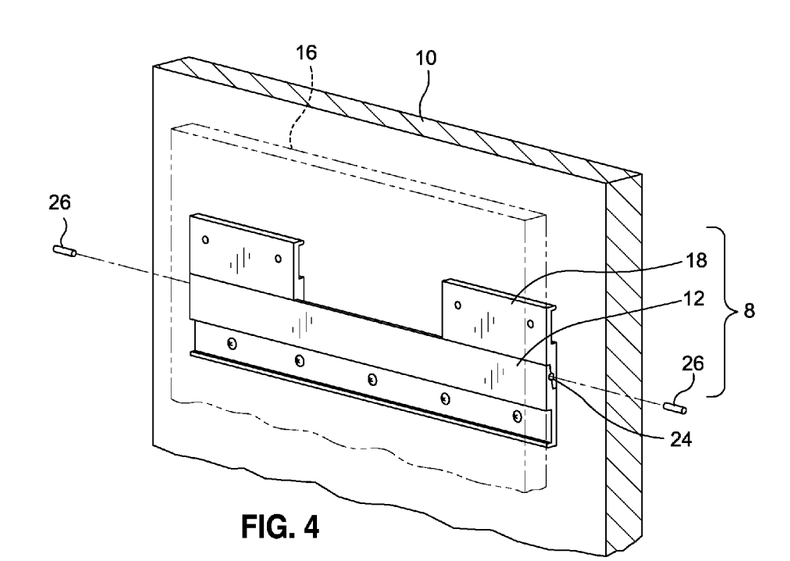
FIG. 4 is an elevational view of the first elongated mounting member and the second elongated mounting member in their engaged position with insertable locking elements on each side of a locking channel.

Referring now to FIG. 4, depicted is an elevational view of the wall 10, panel 16, first elongated mounting member 12, and the second elongated mounting member 18 in their mounted and engaged position. The figure depicts a locking channel 24 and two locking elements 26 wherein the locking elements 26 are insertable into each end of the locking channel 26. However, only one locking element 26 may be inserted by the user. The length of the locking element 26 may be of any suitable length that is sufficient to lock the second elongated mounting member 18 to the first elongated mounting member 12. Additionally, the locking element 26 may be made of plastic, metallic, or any other suitable material known in the art. The material may be rigid and have a sufficient tensile strength to maintain the elongated mounting members 12 and 18 in a locked position. Furthermore, once the user inserts the locking element 26 into the locking channel 24, the locking element 24 mitigates movement of the first elongated mounting member 12 and the second elongated mounting member 18 relative to the central axis 88.

Figure 5:
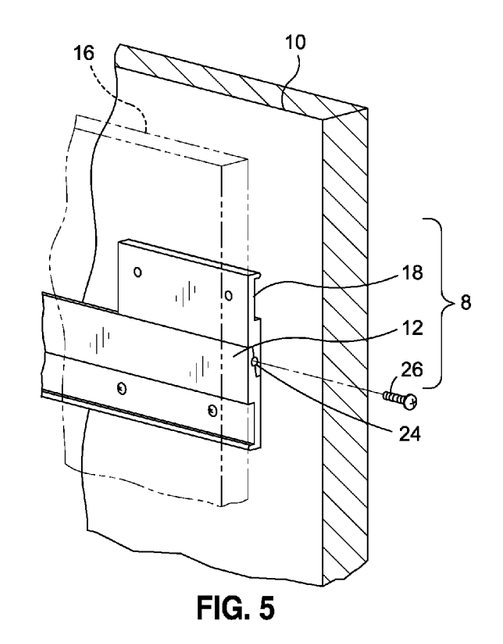
FIG. 5 illustrates a partial elevational view of the first elongated mounting member and the second elongated mounting member in their engaged position with a screw representing the locking element.

Referring now to FIG. 5, the figure depicts a partial elevational view of wall 10, panel 16, first elongated mounting member 12, and the second elongated mounting member 18 in their mounted and engaged position. As discussed above, element 26 may be suitable shape or size that will lock the second elongated mounting member 18 to the first elongated mounting member 12. Here, FIG. 5 depicts a screw or bolt that represents the locking element 26. Furthermore, the locking channel 24 may be internally threaded to accommodate the bolt or screw.

Figure 6:
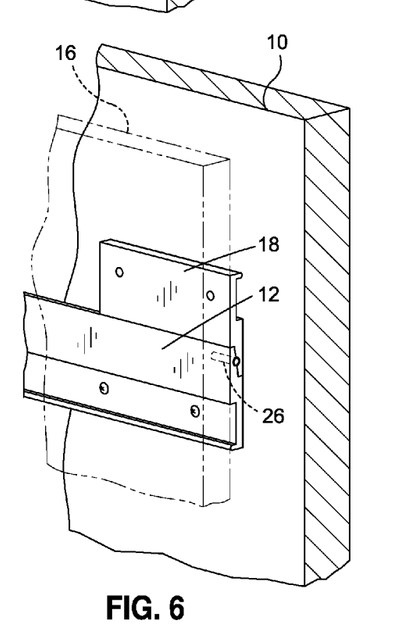
FIG. 6 illustrates a partial elevational view of the first elongated mounting member and the second elongated mounting member in their engaged position with the locking element inserted into one end of the locking channel.

Referring now to FIG. 6, the figure depicts an elevational view of wall 10, panel 16, first elongated mounting member 12, and second elongated mounting member 18 in their locked position. The figure also depicts the locking element 26 positioned inside the locking channel 24. Thus, in a locked position, translation and rotation of the elongated mounting members 12 and 18 may be minimal in a three-dimensional space. In other words, when the user inserts the locking element 26 into the locking channel 24, the locking element may not fit tightly into the locking channel 24 which allows the elongated mounting members 12 and 18 to move slightly. The locked position may prevent a person from pulling the panel 16 away from wall 10; however, the panel 16 may be removed by sliding the panel 12 along the axial direction of the central axis 88.

The shape of the first elongated mounting member 12 and the second elongated mounting member 18 are complimentary with each other which provides a physical abutment when the locking element is inserted into the locking channel. When the two elongated mounting members are engaged, the first notches on the elongated mounting members form the locking channel 24. If the panel 16 is lifted upward and away from the wall 10, the second notch 22 of the second elongated mounting member 18 interferes with the locking element 26. This interference keeps the first elongated member 12 and the second elongated mounting member 18 in a locked position. The locking element resists the upward motion and force caused by panel 16 when it is lifted and pulled away from the wall 10. The locking element 26 essentially prevents the second elongated mounting member 18 from being disengaged from the first elongated member 12. Since the locking member 26 restrains the second elongated member 18 to the first elongated mounting member 12, the locking member 26 may be subject high shear and bending loads caused by the pulling motion of panel 16. Therefore, to ensure that the locking element 26 can resist the shear and bending loads, the locking element 18 may be fabricated from steel, aluminum, high strength composite, or any other suitable material that can keep the first elongated member 12 and the second elongated mounting member 18 in the locked position.

Figure 7:
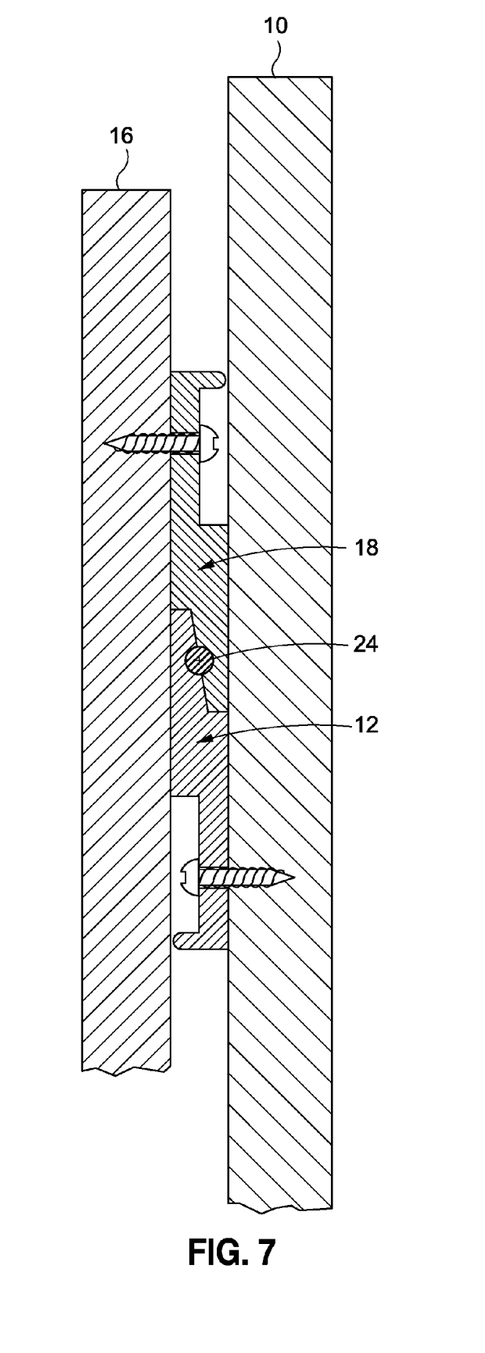
FIG. 7 illustrates a side view of a panel and wall with the attached first elongated mounting member and second elongated mounting member in an engaged position with a circular shape locking channel.
Figure 8:
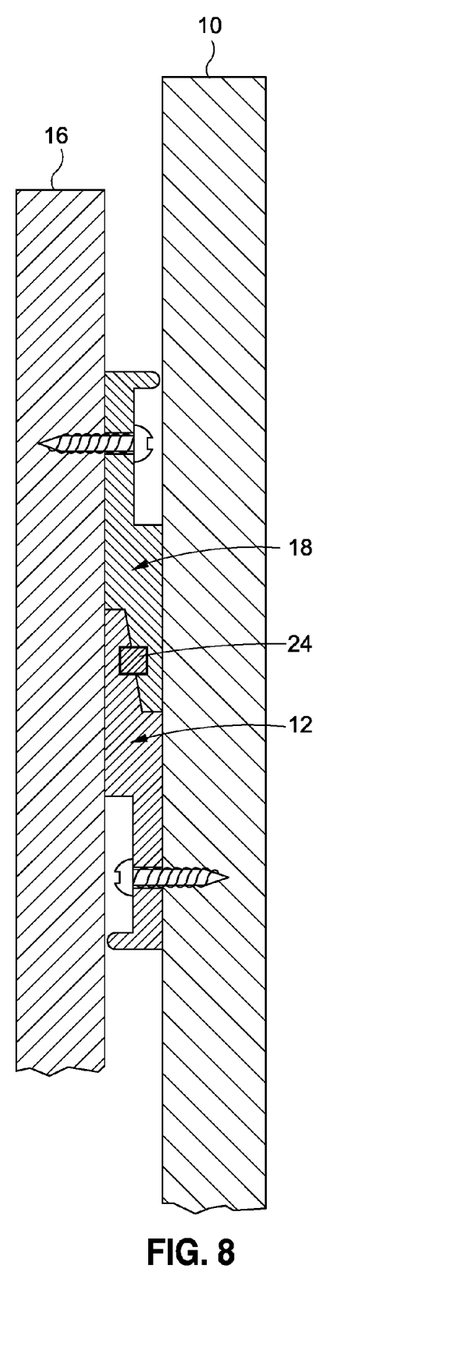
FIG. 8 illustrates a side view of a panel and wall with the attached first elongated mounting member and second elongated mounting member in an engaged position with a square shape locking channel.

Referring now to FIGS. 7 and 8, the figures depicts a side view of a panel 16 and wall 10 with the attached first elongated mounting member 12 and second elongated mounting member 18 in an engaged position. In particular, the locking channel 24 and locking element 26 are shown to have a circular and square configuration. As discussed above, the locking channel 24 and the locking element 26 are not limited to specific configuration; it may be any other suitable shape, such as oval, rectangular, triangular, etc.

With the basic structural features of positive locking hanging system 8 described above, an exemplary description of use of the positive locking hanging system 8 is provided herein below. In one example, the user may first verify the desired placement and position of the panel 16 on the wall 10. Once the user confirms the desired placement of panel 16, the user may attach the first elongated mounting member 12 to the mounting surface 14 of the wall 10. As discussed above, the user may attach the first elongated mounting member 12 by inserting wall fasteners 52 through the plurality of holes 54(a), . . . 54 (N) that are disposed about the first mounting surface 56 of the first elongated mounting member 12 to affix the first elongated mounting member 12 to the wall 10.

Once the first elongated mounting member 12 is attached to the wall 10, the user may couple the second elongated mounting member 18 to the panel 16. In a similar fashion, the user may use mechanical fasteners 28 to couple the second elongated mounting member 18 to the panel 16 by inserting and fastening the mechanical fasteners 28 through the holes 30(*a*), . . . 30(N) that are disposed about the second mounting surface 32 of the second elongated mounting member 18.

At this stage, the user may verify that the first elongated mounting member 12 and the second elongated mounting member 18 are securely affixed to the wall 10 and panel 16. The user may then proceed to engage the first elongated mounting member 12 to the second elongated mounting member 18 by positioning panel 16 so that the second engagement surface 72 is engaged with the first engagement surface 60. Once the engagement surfaces are appropriately aligned, the user may confirm that a locking channel 24 has been created by verifying that the first notch 20 located on the first elongated mounting member 12 is aligned to the second notch 22 located on the second elongated mounting member.

Finally, to lock the second elongated mounting member 18 to the first elongated mounting member 12, the user may insert the locking element 26 into the locking channel 24. After the user inserts the locking element 26 into the locking channel 24, the user may test to see if the panel 16 can be removed from the wall 10 by lifting and pulling on the panel 16.

In the event the user decides to remove the panel 16 from the wall 10, the user may first remove the locking element 26 from the locking channel 24. The locking element 26 may be physically removed by hand, or with the assistance of a hand tool. The second elongated mounting member 18 may then be disengaged from the first elongated mounting member 12 by lifting the panel 16 upwards and away from the wall 10.

It is to be appreciated that specific dimensions, proportions, shapes and configurations of each of the first elongated mounting member 12, the second elongated mounting member 18, and locking element 26 are not limited by the present disclosure. For example, the shape of the first elongated mounting member 12 and the second elongated mounting member 18 may be of any other suitable shape that can create the locking channel 24 when the elongated mounting members are engaged.

Furthermore, although the foregoing describes the positive locking hanging system 8 as being particularly suited for a panel and a wall, in this respect, various embodiments of the positive locking hanging system 8 may be particularly adapted for use with other objects.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

The detailed description set forth above in connection with the appended drawings is intended as a description of certain embodiments of locking a panel to a wall through the use of a positive locking hanging system 8, and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

What is claimed is:

1. A system for mounting a panel to a mounting surface, the system comprising:
   a first elongated mounting member configured to be attachable to the mounting surface, the first elongated mounting member including:
      a first mounting surface defining a first mounting plane;
      a first distal surface in generally opposed relation to the first mounting surface and defining a first distal plane;
      a first engagement surface extending longitudinally along the first elongated mounting member and residing between the first mounting plane and the first distal plane;
      a first notch surface extending into the first elongated mounting member from the first engagement surface; and
   a second elongated mounting member configured to be attachable to the panel, the second elongated mounting member including:
      a second mounting surface defining a second mounting plane;
      a second distal surface in generally opposed relation to the second mounting surface and defining a second distal plane;
      a second engagement surface extending longitudinally along the second elongated mounting member and residing between the second mounting plane and the second distal plane; and
      a second notch surface extending into the second elongated mounting member from the second engagement surface;
   the first engagement surface being selectively engagaeable with the second engagement surface to mount the panel to the mounting surface, the first notch surface and the second notch surface collectively and substantially extending around a central axis to form a locking channel when the first engagement surface is engaged with the second engagement surface.

2. The system of claim 1, further comprising a locking element configured to be at least partially insertable into the locking channel to lock the first elongated mounting member to the second elongated mounting member.

3. The system of claim 2, wherein the locking element mitigates movement of the first elongated mounting member relative to the second elongated mounting member along the central axis.

4. The system of claim 1, wherein an insertion of the locking element into the locking channel creates interference fit between the locking element with respect to the first elongated mounting member and the second elongated mounting member.

5. The system for mounting a panel of claim 1, wherein the entirety of the first engagement surface is spaced from the first mounting plane and the entirety of the second engagement surface is spaced from the second mounting plane.

6. The system of claim 1, wherein the first engagement surface and the second engagement surface are in direct contact with each other when the first engagement surface is engaged with the second engagement surface.

7. The system of claim 1, wherein the first mounting surface and the second mounting surface each include a plurality of holes, each hole being adapted to receive to a mechanical fastener.

8. The system of claim 1, wherein the first engagement surface and the second engagement surface define angles relative to the first mounting plane and the second mounting plane, respectively, between 5 degrees and 20 degrees.

9. The system of claim 8, wherein the angles are approximately 9 degrees.

10. The system of claim 1, further comprising a first shoulder extending between the first engagement surface and the first distal surface that is complementary with a second abutment surface positioned between the second engagement surface and the second mounting plane.

11. The system of claim 1, further comprising a second shoulder extending between the second engagement surface and the second distal surface that is complementary with a first abutment surface positioned between the first engagement surface and the first mounting plane.

12. The system of claim 1, wherein the first elongated mounting member and the second elongated mounting member are fabricated from an extrudable material.

13. Apparatus for locking a panel to a mounting surface, the apparatus comprising:
a male member configured to be coupled to the panel, the male member including:
a first coupling surface defining a first coupling plane;
a first engagement portion having a distal surface that defines a distal plane and a first engagement surface, the first engagement surface being angled relative to the first coupling plane; and
a first locking surface extending into the male member from the first engagement surface; and
a female member configured to be coupled to the mounting surface, the female member including:
a second coupling surface defining a second coupling plane;
a second engagement portion positioned between a second engagement surface and the second coupling plane, the second engagement surface being angled relative to the second coupling plane; and
a second locking surface extending into the female member from the second engagement surface;
the first engagement portion of the male member being selectively insertable to the second engagement portion of the female member to form a locking channel created by the first locking surface and the second locking surface.

14. The apparatus of claim 13, further comprising a locking element configured to be at least partially insertable into the locking channel to lock the female member to the male member.

15. The apparatus of claim 14, wherein the locking element mitigates translation and rotation of the female member relative to the male member.

16. The apparatus of claim 14, wherein insertion of the locking element into the locking channel creates a clearance between the locking element with respect to the male member and female member that is sufficient to maintain the first female member and the male member in a locked position.

17. The apparatus of claim 13, wherein the distal plane is substantially coplanar with the second coupling plane.

18. The apparatus of claim 13, wherein the first coupling surface and the second coupling surface each include a plurality of holes, each hole being adapted to receive to a mechanical fastener.

19. The apparatus of claim 13, wherein the first engagement surface and the second engagement surface define angles relative to the first coupling plane and the second coupling plane, respectively, between 5 degrees and 20 degrees.

20. The apparatus of claim 13, wherein the male member and the female member are fabricated from an extrudable material.

* * * * *